United States Patent
Huang et al.

(10) Patent No.: US 11,812,166 B2
(45) Date of Patent: Nov. 7, 2023

(54) DISPLAY SYSTEM, DISPLAY METHOD AND IMAGE CAPTURE DEVICE

(71) Applicant: AVer Information Inc., New Taipei (TW)

(72) Inventors: Cheng-Wei Huang, New Taipei (TW); Han-Yen Chang, New Taipei (TW)

(73) Assignee: AVer Information Inc., New Taipei (TW)

( * ) Notice: Subject to any disclaimer, the term of this patent is extended or adjusted under 35 U.S.C. 154(b) by 0 days.

(21) Appl. No.: 17/655,364

(22) Filed: Mar. 17, 2022

(65) Prior Publication Data

US 2022/0303463 A1 Sep. 22, 2022

(30) Foreign Application Priority Data

Mar. 18, 2021 (TW) ................. 110109817

(51) Int. Cl.
*H04N 23/951* (2023.01)
*H04N 23/63* (2023.01)
*H04N 23/667* (2023.01)
*H04N 23/80* (2023.01)

(52) U.S. Cl.
CPC .......... *H04N 23/951* (2023.01); *H04N 23/63* (2023.01); *H04N 23/632* (2023.01); *H04N 23/667* (2023.01); *H04N 23/815* (2023.01)

(58) Field of Classification Search
CPC .... H04N 23/951; H04N 23/63; H04N 23/632; H04N 23/667; H04N 23/815; H04N 23/80
See application file for complete search history.

(56) References Cited

U.S. PATENT DOCUMENTS

2018/0084181 A1* 3/2018 Sachs ...................... H04N 23/73
2021/0034910 A1* 2/2021 Hoevenaar ................ G06T 5/50

FOREIGN PATENT DOCUMENTS

TW 200939779 A 9/2009

OTHER PUBLICATIONS

Wenzhe Shi et al., "Real-Time Single Image and Video Super-Resolution Using an Efficient Sub-Pixel Convolutional Neural Network", 2016 IEEE Conference on Computer Vision and Pattern Recognition (CVPR), pp. 1874-1883.

* cited by examiner

*Primary Examiner* — Timothy J Henn
(74) *Attorney, Agent, or Firm* — CKC & Partners Co., LLC

(57) ABSTRACT

A display system includes a camera, a processor and a display. The camera is configured to shoot a first image and a second image in order. The processor is configured to generate a third image when a difference between the first image and the second image is larger than or equal to a preset difference value. The display is configured to display the first image and the third image in order when the difference is larger than or equal to the preset difference value. A display method and an image capture device are also disclosed herein.

20 Claims, 4 Drawing Sheets

DISPLAY SYSTEM, DISPLAY METHOD AND IMAGE CAPTURE DEVICE

CROSS-REFERENCE TO RELATED APPLICATION

This application claims priority to Taiwan Application Serial Number 110109817, filed Mar. 18, 2021, which is herein incorporated by reference in its entirety.

BACKGROUND

Technical Field

The present disclosure relates to a display technique. More particularly, the present disclosure relates to a display system, a display method and an image capture device.

Description of Related Art

In traditional display method, when zooming operations are performed to a digital image shot by a camera, the zooming operations may suffer from limits of resolution. When the image is zooming in to the limits of the resolution, the image becomes blurred. In some approaches, artificial intelligence is introduced to a super resolution model, such that the image is clarified. However, continuously performing operations by the super resolution model increases efficacy consumption of a system, and time consumed is longer. Thus, techniques associated with the development for overcoming the problems described above are important issues in the field.

SUMMARY

The present disclosure provides a display system. The display system includes a camera, a processor and a display. The camera is configured to shoot a first image and a second image in order. The processor is configured to generate a third image when a difference between the first image and the second image is larger than or equal to a preset difference value. The display is configured to display the first image and the third image in order when the difference is larger than or equal to the preset difference value. The third image is a high resolution version of the second image.

The present disclosure provides a display method. The display method includes: generating a first image and a second image in order; generating a ratio associated with a difference between the first image and the second image; when the ratio is larger than a preset ratio, displaying the first image; and when the ratio is smaller than the preset ratio, generating a high resolution version of the second image according to the second image, and displaying the high resolution version.

The present disclosure provides an image capture device. The image capture device includes a camera and a processor. The camera is configured to shoot a first image and a second image in order. The processor is configured to generate a third image when a difference between the first image and the second image is larger than or equal to a preset difference value. When the difference is larger than or equal to the preset difference value, the processor is further is configured to output the first image and the second image in order, and the third image is a high resolution version of the second image.

It is to be understood that both the foregoing general description and the following detailed description are by examples, and are intended to provide further explanation of the disclosure as claimed.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
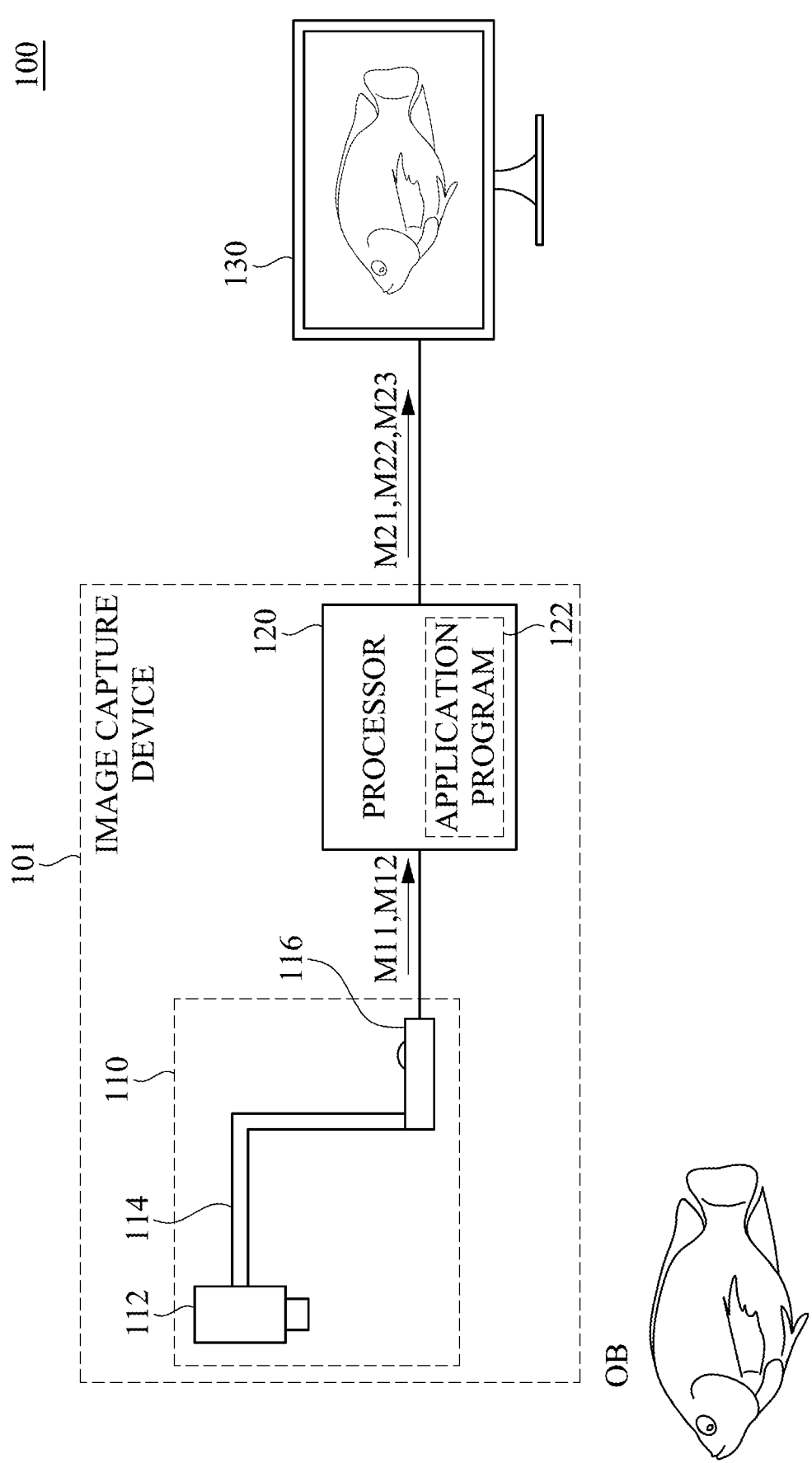
FIG. 1 is a schematic diagram of a display system illustrated according to some embodiments of this disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper", "left," "right" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The terms applied throughout the following descriptions and claims generally have their ordinary meanings clearly established in the art or in the specific context where each term is used. Those of ordinary skill in the art will appreciate that a component or process may be referred to by different names. Numerous different embodiments detailed in this specification are illustrative only, and in no way limits the scope and spirit of the disclosure or of any exemplified term.

It is worth noting that the terms such as "first" and "second" used herein to describe various elements or processes aim to distinguish one element or process from another. However, the elements, processes and the sequences thereof should not be limited by these terms. For example, a first element could be termed as a second element, and a second element could be similarly termed as a first element without departing from the scope of the present disclosure.

In the following discussion and in the claims, the terms "comprising," "including," "containing," "having," "involving," and the like are to be understood to be open-ended, that is, to be construed as including but not limited to. As used herein, instead of being mutually exclusive, the term "and/or" includes any of the associated listed items and all combinations of one or more of the associated listed items.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

Reference will now be made in detail to the present embodiments of the disclosure, examples of which are illustrated in the accompanying drawings. Wherever possible, the same reference numbers are used in the drawings and the description to refer to the same or like parts.

FIG. 1 is a schematic diagram of a display system 100 illustrated according to some embodiments of this disclosure. In some embodiments, the display system 100 is configured to display images, such as images M21-M23 shown in FIG. 1.

As illustratively shown in FIG. 1, the display system 100 includes a camera 110, a processor 120 and a display 130. In some embodiments, the display system 100 is configured to shoot an object OB and display an image corresponding to the object OB. In the embodiment shown in FIG. 1, the camera 110 and the processor 120 are included in an image capture device 101.

In some embodiments, the camera 110 is configured to shoot the object OB to generate the corresponding images M11 and M12. In some embodiments, the camera 110 is configured to shoot the object OB continuously, to generate the images M11 and M12 in order. In some embodiments, the camera 110 outputs the images M11 and M12 in a streaming manner. In some embodiments, the camera 110 shoots the object OB and outputs the images M11 and M12 simultaneously.

In some embodiments, the camera 110 is implemented as a document camera. In some embodiments, the camera 110 is an USB video class device, but not limited to this.

As illustratively shown in FIG. 1, the camera 110 includes a camera lens 112, a support 114 and a control panel 116. In some embodiments, the camera lens 112 is configured to shoot the object OB. The support 114 is configured to support the camera lens 112, such that the camera lens 112 is aligned with the object OB. The control panel 116 is configured to control at least one of the camera lens 112 or the support 114. For example, the control panel 116 controls the support 114 to move the camera lens 112 to a position which is proper for shooting the object OB. In various embodiments, the support 114 may be implemented as a gooseneck type arm or a mechanical arm.

In some embodiments, the processor 120 is configured to process the images M11 and M12 shot by the camera 110 to generate at least one of the images M21, M22 and M23. The images M21 and M22 correspond to the images M11 and M12, respectively. In some embodiments, the image M23 is a high resolution version of the image M12.

In some embodiments, the processor 120 is coupled to the camera 110 and the display 130. For example, the processor 120 is coupled to the camera 110 and the display 130 through a universal serial bus (USB) to receive at least one of the images M11 and M12, and transmits at least one of the images M21, M22 and M23 to the display 130.

In some embodiments, the processor 120 stores application programs 122, and operates according to the application programs 122. In some embodiments, the application programs 122 are at least one of software or firmware. In some embodiments, the processor 120 is configured to process at least one of the images M11 and M12 according to the application programs 122, such as zoom in, zoom out and/or crop. In some embodiments, the processor 120 is configured to generate the image M23 according to the application programs 122 and the image M12. In some embodiments, the application programs 122 include super resolution operations using artificial intelligence. In some embodiments, the application programs 122 include super resolution operations using either one or combination of interpolation and neural network.

In some embodiments, the display 130 is configured to display at least one of the images M21, M22 and M23.

Figure 2:
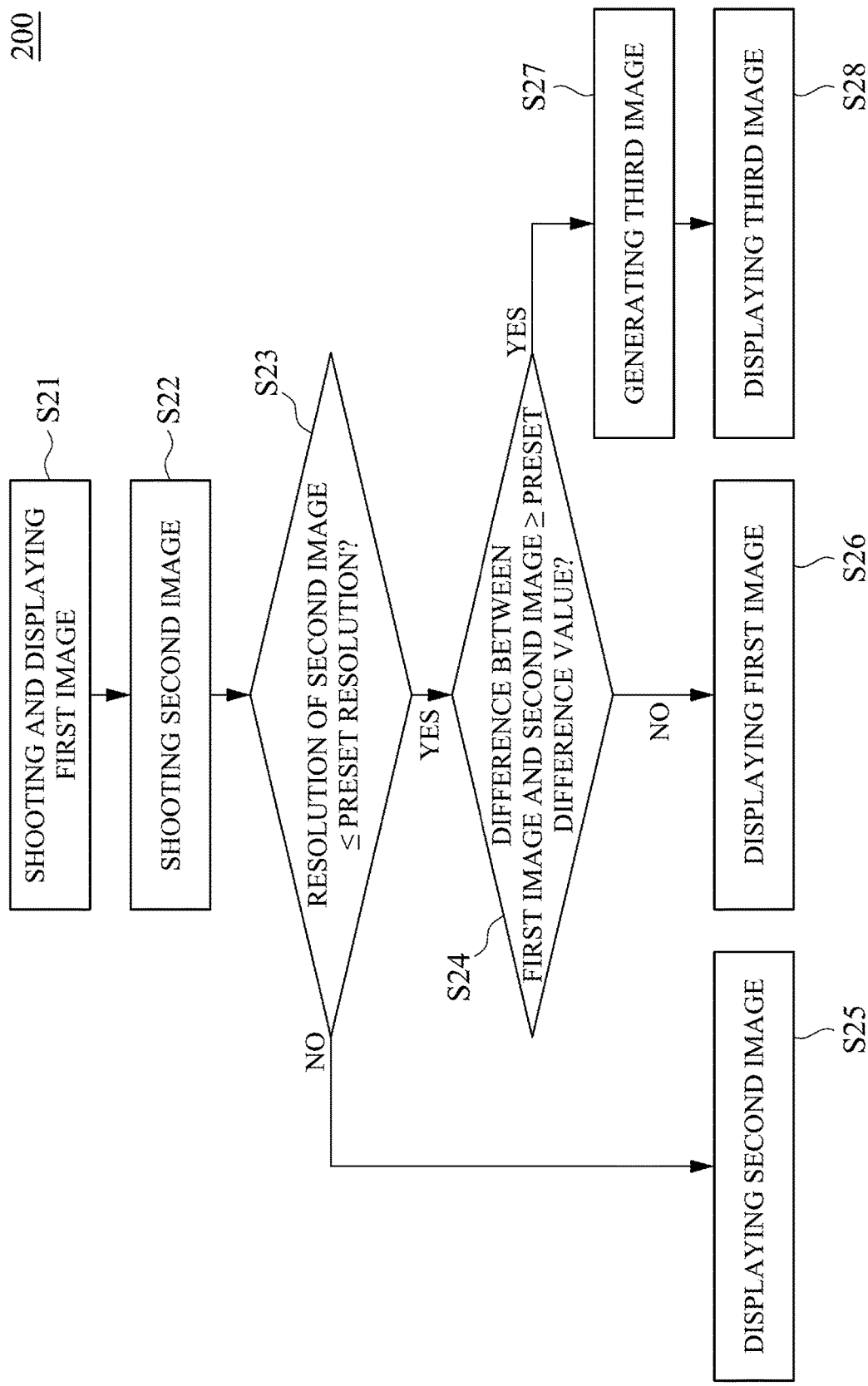
FIG. 2 is a flowchart diagram of a display method illustrated according to some embodiments of this disclosure.

FIG. 2 is a flowchart diagram of a display method 200 illustrated according to some embodiments of this disclosure. In some embodiments, the display method 200 is applied to the display system 100 shown in FIG. 1, but embodiments of present disclosure are not limited to this. In various embodiments, the display method 200 may be applied to other kinds of display systems. For illustration purpose, operations of the display method 200 are described below with components of the display system 100 as an example.

As illustratively shown in FIG. 2, the display method 200 includes operations S21-S28. In various embodiments, display methods provided by present disclosure include a part or combination of the operations S21-S28.

At the operation S21, the camera 110 shot the object OB to generate the image M11. The processor 120 transmits the image M21 corresponding to the image M11 to the display 130. The display 130 displays the image M21.

At the operation S22, the camera 110 shot the object OB to generate the image M12.

At the operation S23, the processor 120 generates the image M22 corresponding to the image M12 according to the image M12, and determines whether a resolution of the image M22 is smaller than or equal to a preset resolution. In some embodiments, the preset resolution is 160×120, but embodiments of present disclosure are not limited to this. In various embodiments, the preset resolution may be different numerical values.

If the processor 120 determines that the resolution of the image M22 is smaller than or equal to the preset resolution at the operation S23, the display system performs the operation S24. At the operation S24, the processor determines whether a difference between the image M21 and M22 is larger than or equal to a preset difference value. In various embodiments, the processor 120 determines the difference between the image M21 and M22 based on various parameters. For example, the processor 120 determines the difference according to at least one of a pixel difference, a color difference or a feature value difference of the images M21 and M22. In some embodiments, the processor 120 processes the image M21 as a signal, processes the image M22 as a noise, calculates a corresponding peak signal to noise ratio (PSNR), and determines the difference according to the PSNR.

If the processor 120 determines that the resolution of the image M22 is larger than the preset resolution at the operation S23, the display system performs the operation S25. At the operation S25, the display 130 is configured to display the image M22.

If the processor 120 determines that the difference between the images M21 and M22 is smaller than the preset difference value at the operation S24, the display system performs the operation S26. At the operation S26, the display 130 is configured to display the image M21.

If the processor 120 determines that the difference between the images M21 and M22 is larger than or equal to the preset difference value at the operation S24, the display system performs the operation S27. At the operation S27, the processor 120 is configured to generate the image M23 according to the image M22. At the operation S28, the display 130 is configured to display the image M23.

Figure 3:
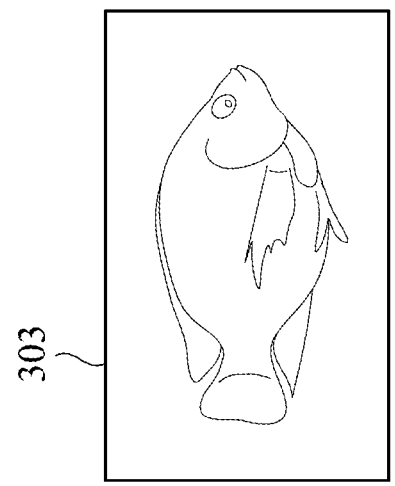
FIG. 3 is a schematic diagram of an image shot by a camera illustrated according to some embodiments of this disclosure.
Figure 3:
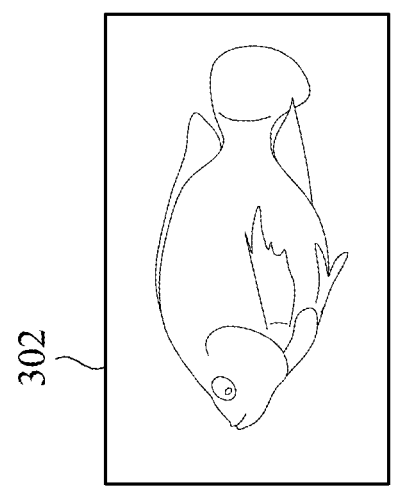
Figure 3:
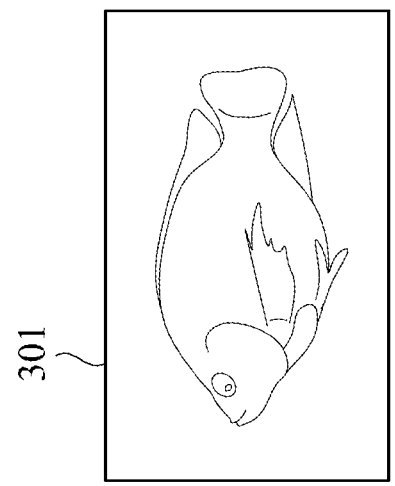

FIG. 3 is a schematic diagram of an image shot by the camera 110 illustrated according to some embodiments of this disclosure. FIG. 3 includes images 301-303. Referring to FIG. 2 and FIG. 3, operations of the display method 200 are described below with the images 301-303.

In some embodiments, the image 301 corresponds to the images M11 and M21, and the images 302 and 303 correspond to the images M12, M22 and M23 under different circumstances. In some embodiments, a difference between the images 301 and 302 is smaller than the preset difference value, and a difference between the images 301 and 303 is larger than the preset difference value. In some embodiments, in response to amplitude of variation of the object OB being small, the camera shoots the object OB and generates the images 301 and 302 in order according to the variation of the object OB. In response to amplitude of variation of the object OB being large, the camera shoots the object OB and generates the images 301 and 303 in order according to the variation of the object OB.

Three circumstances are described below as examples. In the three circumstances described below, a resolution of the image 301 is larger than the preset resolution.

In the first circumstance, resolutions of the images 302 and 303 are larger than the preset resolution. Correspondingly, the display system 100 performs the operation S25, and the display 130 displays the image 302 or 303 directly according to the variation of the object OB. In the first circumstance, the processor 120 does not perform the super resolution operation.

In the second circumstance, the variation of the object OB corresponds to the image 302. Correspondingly, the display system 100 performs the operation S26, and the display 130 displays the image 301. In the second circumstance, the processor 120 does not perform the super resolution operation.

In the third circumstance, the variation of the object OB corresponds to the image 303. Correspondingly, the display system 100 performs the operations S27-S28, the processor 120 performs the super resolution operation to the image 303 to generate a high resolution version of the image 303, and the display 130 displays the high resolution version of the image 303. In which the high resolution version of the image 303 has a resolution higher than the preset resolution.

In the three circumstances described above, resolutions of images displayed by the display 130 are higher than the preset resolution.

In some approaches, a processor performs high resolution operations to images shot by a camera continuously, such that consumption of efficacy of a system is high, and operation time is long.

Compared to the above approaches, in some embodiments of present disclosure, the high resolution operations are not performed when the resolution of the image is larger than the preset resolution. The high resolution operations are also not performed, and the image 301 having a high resolution is displayed directly when the variation (such as the variation corresponding to the images 301 and 302) of the object shot by the camera is small. As a result, under the condition that a quality of the image displayed by the display 130 is maintained, the display system 100 has a lower consumption of efficacy and shorter operation time.

Figure 4:
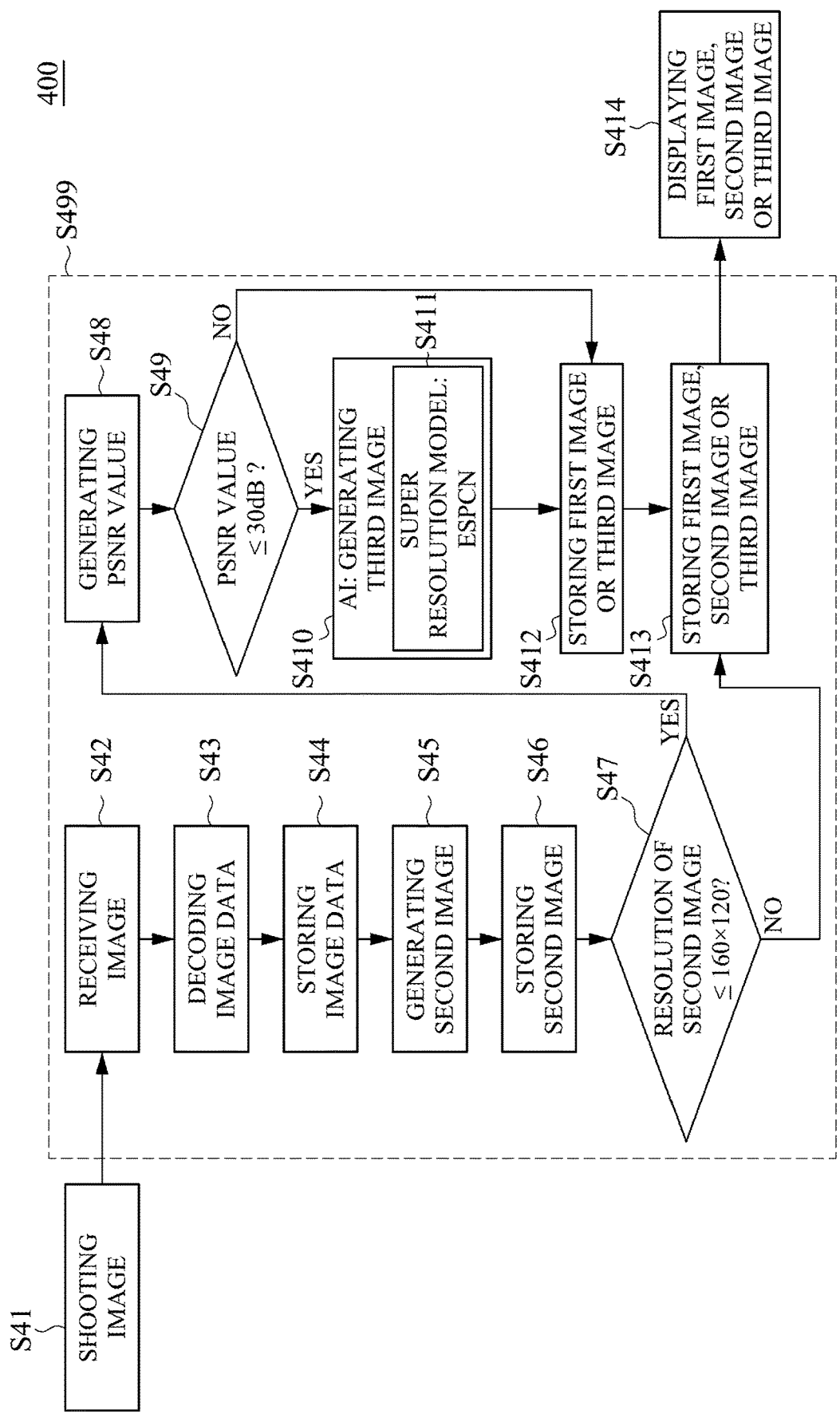
FIG. 4 is a flowchart diagram of a display method illustrated according to some embodiments of this disclosure.

FIG. 4 is a flowchart diagram of a display method 400 illustrated according to some embodiments of this disclosure. In some embodiments, the display method 400 is applied to the display system 100 shown in FIG. 1, but embodiments of present disclosure are not limited to this. In various embodiments, the display method 400 may be applied to other kinds of display systems. For illustration purpose, operations of the display method 400 are described below with components of the display system 100 as an example.

As illustratively shown in FIG. 4, the display method 400 includes operations S41, S499 and S414, in which the operation S499 includes operations S42-S413. In various embodiments, display methods provided by present disclosure include a part or combination of the operations S41-S414.

Referring to FIG. 4 and FIG. 2, the display method 400 is an alternative embodiment of the display method 200. The operations S41, S47 S49 and S410 correspond to the operations S22, S23, S24 and S27, respectively, and the operation S414 corresponds to the operations S25, S26 and S28. Therefore, some descriptions are not repeated for brevity.

Before the operation S41, the display 130 is configured to display a first image. At the operation S41, the camera 110 shoots the object OB to generate an original image of a second image, and transmit MJPEG format data of the original image to the processor 120 through an USB line transmission.

At the operation S499, the processor 120 provides the first image, the second image and a third image to the display 130 by the application program 122 according to the second image.

At the operation S414, the display 130 displays the first image, the second image and the third image from the processor 120.

Further details of the operations S42-S413 in the operation S499 are described below. At the operation S42, a receiver in the processor 120 receives the original image shot by the camera 110.

At the operation S43, a decoder in the processor 120 decodes the MJPEG format data of the original image to generate RGB image data of the original image.

At the operation S44, a buffer in the processor 120 stores the RGB image data of the original image.

At the operation S45, a user performs zoom in/out and crop operations to the original image to generate the second image corresponding to details those the user desires to see. In some embodiments, the second image has a resolution lower than a resolution of the original image.

At the operation S46, the buffer in the processor 120 stores the second image.

At the operation S47, the processor checks whether the resolution of the second image is smaller than or equal to the preset resolution. In the embodiment shown in FIG. 4, the preset resolution is 160×120.

If the processor 120 determines that the resolution of the second image is larger than 160×120 at the operation S47, the processor 120 stores the second image into the buffer configured to store an image for displaying corresponding to the operation S413. If the processor 120 determines that the resolution of the second image is smaller than or equal to 160×120 at the operation S47, the operation S48 is performed.

At the operation S48, a PSNR module in the processor 120 generates a corresponding PSNR value according to the second image and the first image. In which the PSNR module processes the first image as a signal and processes the second image as a noise, to generate the PSNR value. In response to a difference between the second image and the first image being smaller, the PSNR value is larger.

At the operation S49, the processor checks whether the PSNR value is smaller than or equal to a preset PSNR value. In the embodiment shown in FIG. 4, the preset PSNR value is 30 dB, but embodiments of present disclosure are not limited to this.

If the processor 120 determines that the PSNR value is larger than 30 dB at the operation S49, the processor 120 stores the first image into the buffer corresponding to high resolution images corresponding to the operation S412. If the processor 120 determines that the resolution of the second image is smaller than or equal to 30 dB at the operation S49, the operation S410 is performed.

At the operation S410, the processor 120 generates the third image by artificial intelligence according to the second image. The third image is a high resolution version of the second image. In various embodiments, the resolution of the third image may be twice, three times or four times of the resolution of the second image, but embodiments of present disclosure are not limited to this.

In some embodiments, the operation S410 includes the operation S411. At the operation S411, the processor 120 generates the third image by a super resolution model of an efficient sub-pixel convolutional neural network (ESPCN) according to the second image.

At the operation S412, the buffer, in the processor 120, corresponding to high resolution images stores the first image or the third image according to the operation S49.

At the operation S413, the buffer, in the processor 120, configured to store an image for displaying stores the first image, the second image or the third image according to the operations S412 and S47, and outputs the stored images to the display 130.

At the operation S414, the display 130 displays the first image, the second image or the third image according to the image stored at the operation S413.

In summary, in some embodiments of present disclosure, by performing the operations S23, S24, S47 and S49, the display system 100 may not perform the super resolution operation when the resolution of the image is higher than the preset resolution or the variation of the image is small, such that the display system 100 has a lower consumption of efficacy and a shorter operation time.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A display system, comprising:
   a camera configured to shoot a first image and a second image in order;
   a processor configured to generate a third image when a difference between the first image and the second image is larger than or equal to a preset difference value; and
   a display configured to display the first image and the third image in order when the difference is larger than or equal to the preset difference value,
   wherein the third image is a high resolution version of the second image.

2. The display system of claim 1, wherein the processor does not generate the third image when the difference is smaller than the preset difference value, and
   the display is further configured to display the first image when the difference is smaller than the preset difference value.

3. The display system of claim 1, wherein the display is further configured to display the first image and the second image in order when a resolution of the second image is larger than a preset resolution.

4. The display system of claim 3, wherein the processor does not generate the third image when the resolution of the second image is larger than the preset resolution.

5. The display system of claim 1, wherein the processor is further configured to output the third image when a resolution of the second image is smaller than a preset resolution and the difference between the first image and the second image is larger than or equal to the preset difference value.

6. The display system of claim 5, wherein the preset resolution is 160×120.

7. The display system of claim 1, wherein the processor is further configured to calculate a peak signal to noise ratio by processing the first image as a signal and processing the second image as a noise,
   wherein the difference corresponds to the peak signal to noise ratio.

8. The display system of claim 7, wherein the preset difference value corresponds to 30 dB.

9. The display system of claim 1, wherein the third image is generated by a sub-pixel convolutional neural network with artificial intelligence.

10. The display system of claim 1, wherein the processor is further configured to store the first image or the third image when a resolution of the second image is smaller than or equal to 160×120.

11. A display method, comprising:
    generating a first image and a second image in order;
    generating a ratio associated with a difference between the first image and the second image;
    when the ratio is larger than a preset ratio, displaying the first image; and
    when the ratio is smaller than the preset ratio, generating a high resolution version of the second image according to the second image, and displaying the high resolution version.

12. The display method of claim 11, further comprising:
    when the ratio is smaller than the preset ratio, displaying the first image and the high resolution version of the second image in order.

13. The display method of claim 12, further comprising:
    determining a resolution of the second image; and when the resolution is larger than or equal to a preset resolution, displaying the first image and the second image in order, without generating the high resolution version of the second image.

14. The display method of claim 13, further comprising: when the resolution is smaller than the preset resolution and the ratio is larger than the preset ratio, displaying the first image, without generating the high resolution version of the second image.

15. The display method of claim 14, further comprising: when the resolution is smaller than the preset resolution and the ratio is smaller than or equal to the preset ratio, displaying the first image and the high resolution version of the second image in order.

16. The display method of claim 15, wherein the preset resolution is 160×120, and the preset ratio is 30 dB.

17. An image capture device, comprising:
a camera configured to shoot a first image and a second image in order; and
a processor configured to generate a third image when a difference between the first image and the second image is larger than or equal to a preset difference value,
wherein when the difference is larger than or equal to the preset difference value, the processor is further is configured to output the first image and the second image in order, and the third image is a high resolution version of the second image.

18. The image capture device of claim 17, wherein the processor is further configured to output the third image when a resolution of the second image is smaller a preset resolution and the difference between the first image and the second image is larger than or equal to the preset difference value.

19. The image capture device of claim 18, wherein the processor does not generate the third image when the difference is smaller than the preset difference value or when the resolution is larger than or equal to the preset resolution.

20. The image capture device of claim 19, wherein the processor is further configured to output the first image and the second image in order when the resolution is larger than or equal to the preset resolution and the difference is larger than or equal to the preset difference value.

* * * * *